United States Patent
Ghosh et al.

(10) Patent No.: US 12,321,213 B1
(45) Date of Patent: Jun. 3, 2025

(54) POWER MANAGEMENT OF A NETWORK DEVICE

(71) Applicant: Juniper Networks, Inc., Sunnyvale, CA (US)

(72) Inventors: Sandip Kumar Ghosh, Bangalore (IN); Srinivasan Venkatakrishnan, Bangalore (IN); Jameesh Kundanthodika, Bangalore (IN); Vyasraj Satyanarayana, Bangalore (IN); Kishan Illur, Bangalore (IN); James R. Henderson, Roanoke, VA (US)

(73) Assignee: Juniper Networks, Inc., Sunnyvale, CA (US)

(*) Notice: Subject to any disclaimer, the term of this patent is extended or adjusted under 35 U.S.C. 154(b) by 149 days.

(21) Appl. No.: 18/068,183

(22) Filed: Dec. 19, 2022

(51) Int. Cl.
  *G06F 1/32* (2019.01)
  *G06F 1/3209* (2019.01)
  *G06F 1/3287* (2019.01)

(52) U.S. Cl.
  CPC .......... *G06F 1/3209* (2013.01); *G06F 1/3287* (2013.01)

(58) Field of Classification Search
  CPC .......................... G06F 1/3209; G06F 1/3287
  See application file for complete search history.

(56) References Cited

U.S. PATENT DOCUMENTS

| | | | |
|---|---|---|---|
| 10,209,763 B2 | 2/2019 | Akella et al. | |
| 2009/0052372 A1* | 2/2009 | Durazzo | H04W 52/225 370/318 |
| 2011/0154070 A1* | 6/2011 | Welter | H04W 52/28 713/310 |
| 2011/0307718 A1* | 12/2011 | Aybay | G06F 1/3287 713/323 |

FOREIGN PATENT DOCUMENTS

WO  WO-2021239238 A1 * 12/2021 ............ H04W 16/22

* cited by examiner

*Primary Examiner* — Stefan Stoynov
(74) *Attorney, Agent, or Firm* — Harrity & Harrity, LLP (57) ABSTRACT

In some implementations, a system may identify historical utilization data associated with a network device. The system may determine, based on the historical utilization data, a utilization forecast for the network device. The system may determine, based on the utilization forecast, a power management plan for the network device. The system may selectively control, based on the power management plan, enablement and disablement of one or more non-forwarding components of the network device.

20 Claims, 8 Drawing Sheets

POWER MANAGEMENT OF A NETWORK DEVICE

BACKGROUND

A network device, such as a router, may include one or more components that enable the network device to operate and/or to forward traffic. In many cases, a component, of the one or more components, consumes power (e.g., electrical power) to enable the network device to operate.

SUMMARY

In some implementations, a method includes identifying, by a system, historical utilization data associated with a network device; determining, by the system and based on the historical utilization data, a utilization forecast for the network device; determining, by the system and based on the utilization forecast, a power management plan for the network device; and selectively controlling, by the system and based on the power management plan, enablement and disablement of one or more non-forwarding components of the network device.

In some implementations, a non-transitory computer-readable medium storing a set of instructions includes one or more instructions that, when executed by one or more processors of a system, cause the system to: determine, based on historical utilization data associated with a network device, a utilization forecast for the network device; determine, based on the utilization forecast, a power management plan for the network device; and selectively control, based on the power management plan, enablement and disablement of one or more non-forwarding components of the network device.

In some implementations, a system includes one or more memories; and one or more processors to: determine a utilization forecast for a network device; determine, based on the utilization forecast, a power management plan for the network device; and selectively control, based on the power management plan, enablement and disablement of one or more components of the network device.

DETAILED DESCRIPTION

The following detailed description of example implementations refers to the accompanying drawings. The same reference numbers in different drawings may identify the same or similar elements.

A network device typically includes one or more forwarding components, such as interface components and/or traffic forwarding components, that directly facilitate forwarding of traffic to and from the network device. The network device typically also includes one or more other components, such as switch fabric components and/or power supply components, that indirectly facilitate forwarding of the traffic to and from the network device. Each of these components consume power when the network device is operating (e.g., is in a "powered on" state). When the network device is underutilized (e.g., the network device is processing less traffic than a particular amount of traffic that the network device is configured to process), this can result in components of the network device consuming power even though the components are being underutilized, or not used at all. This causes the network device to be power inefficient.

Some implementations described herein provide a monitoring system. The monitoring system may obtain utilization data from one or more network devices. Each network device may include one or more forwarding components (e.g., that directly facilitate forwarding of traffic to and/or from the network device) and/or one or more non-forwarding components (e.g., components other than the one or more forwarding components, such as components that indirectly facilitate forwarding of the traffic to and/or from the network device). The monitoring system may determine (e.g., based on the utilization data) a utilization forecast for a network device of the one or more network devices. The monitoring system may thereby determine a power management plan for the network device, and may selectively control one or more components (e.g., at least one forwarding component and/or at least one non-forwarding component) of the network device based on the power management plan. For example, the monitoring system may control one or more components of the network device to be disabled (and therefore to not consume power) when the network device is predicted to have low utilization (e.g., at night for a network device associated with forwarding traffic associated with a daytime operating organization). This reduces an amount of power consumed by the network device (e.g., when the one or more components are disabled), which results in the network device being more power efficient (as compared to not selectively controlling the one or more components based on the power management plan).

Further, in some implementations, the monitoring system may selectively control only the one or more non-forwarding components of the network device. This allows for a reduction in consumption of power of the network device without modification to a "forwarding topology" for traffic that is handled by the network device. That is, the monitoring system may disable a non-forwarding component, such as a switch fabric component or a power source component, which does not affect a path of traffic forwarded to and from the network device. Accordingly, the network device does not need to generate and provide topology update messages (e.g., to other network devices) that affect how traffic is forwarded to and from the network device. In this way, the network device minimizes a disruption to traffic forwarded to and from the network device. The network device therefore provides a consistent forwarding performance (e.g., while the monitoring system is selectively controlling the one or more non-forwarding components of the network device), and reduces an amount of topology-related information that would otherwise need to be exchanged between network devices. This thereby improves a forwarding performance of the network device (as compared to a network device that controls power consumption just by enabling or disabling forwarding components of the network device) as well as other network devices (e.g., that communicate with the network device).

Additionally, in some implementations, the monitoring system may selectively control the one or more non-forwarding components of the network device to cause the one or more non-forwarding components to operate at an optimal efficiency. For example, the monitoring system may selectively control a set of one or more power source components such that a subset of power source components, of the set of one or more power source components, are enabled (and other power source components, of the one or more power sources components, are disabled), which allows each power component, of the subset of power source components, to operate at a load that is optimal for a utilization level of the network device. This further improves a power efficiency of the network device. In a specific example, when a power source component provides an optimal efficiency at a 50% load, and the network device includes eight (8) power source components that are each operating at a 25% load, the monitoring system may selectively disable four (4) of the power source components so that the remaining four (4) enabled power source components operate at a 50% load, which causes the network device to therefore consume less power (e.g., because the four (4) enable power components are each operating at an optimal load).

Further, the monitoring system may obtain current utilization data from the network device, which allows the monitoring system to generate an updated utilization forecast and thereby determine an updated power management plan. The monitoring system then may selectively control one or more components (e.g., at least one forwarding component and/or at least one non-forwarding component) of the network device based on the updated power management plan. This allows the monitoring system to dynamically react to utilization changes of the network device to ensure that the network device provides both a consistent forwarding performance and a power efficient performance.

Moreover, some implementations described herein provide increased control of the network device to an administrator (e.g., a network administrator) of the network device. For example, some implementations provide variable scope configuration to the administrator, such as by allowing the administrator to select whether to enable a topology impacting configuration or non-topology impacting configuration. As another example, the administrator may specify particular components of the network device that are to be selectively controlled. The administrator may specify, for example, some or all of the one or more forwarding components and/or the one or more non-forwarding components that are to be selectively controlled. In an additional example, the administrator may specify, for one or more components of the network device, a hold-time configuration (e.g., an amount of time to wait before initiating disablement of the one or more components), a warm-up-time configuration (e.g., an amount of time prior to a predicted enablement time at which enablement of the one or more components are to be initiated), a minimum-time configuration (e.g., a minimum amount of time that the one or more components need to be disabled, such as to avoid frequent enablement/disablement cycling of the one or more components), and/or another type of configuration.

FIGS. 1A-1D are diagrams of one or more example implementations 100 described herein. As shown in FIGS. 1A-1D, example implementation(s) 100 may include a monitoring system and one or more network devices (shown as network devices 1 through N, where N≥1). The monitoring system and the one or more network devices are described in more detail below in connection with FIGS. 2-4.

As shown in FIGS. 1A-1D, each network device may include one or more forwarding components and one or more non-forwarding components. The one or more forwarding components may be configured to directly facilitate forwarding of traffic to or from the network device. Accordingly, the one or more forwarding components may also be referred to as one or more "external" components or one or more "external-facing" components. The one or more forwarding components may include, for example, at least one of a physical interface component (e.g., an optical interface link, a physical interface device (IFD), a port interface card (PIC), a flexible PIC concentrator (FPC), or a similar component), at least one of a traffic forwarding component (e.g., a packet forwarding engine (PFE), a line card, an application-specific integrated circuit (ASIC), or a similar component), or at least one of a similar component.

The one or more non-forwarding components may include other components of the network device (e.g., that are not forwarding components), such as one or more components that are configured to indirectly facilitate forwarding of traffic to or from the network device. Accordingly, the one or more forwarding components may also be referred to as one or more "internal" components or one or more "internal-facing" components. For example, the one or more non-forwarding components may include at least one of a switch fabric component (e.g., a system interface board (SIB), a switch fabric field-replaceable unit (FRU), or a similar component), at least one of a power source component (e.g., a power supply module (PSM), or a similar component), or at least one of a similar component.

Some implementations described herein are directed to the network device 1, of the one or more network devices, interacting with the monitoring device, but implementations also include any one network device, or any sets of two or more of the network devices, interacting with the monitoring device in a same or similar manner as that described herein in relation to FIGS. 1A-1D.

Figure 1A:
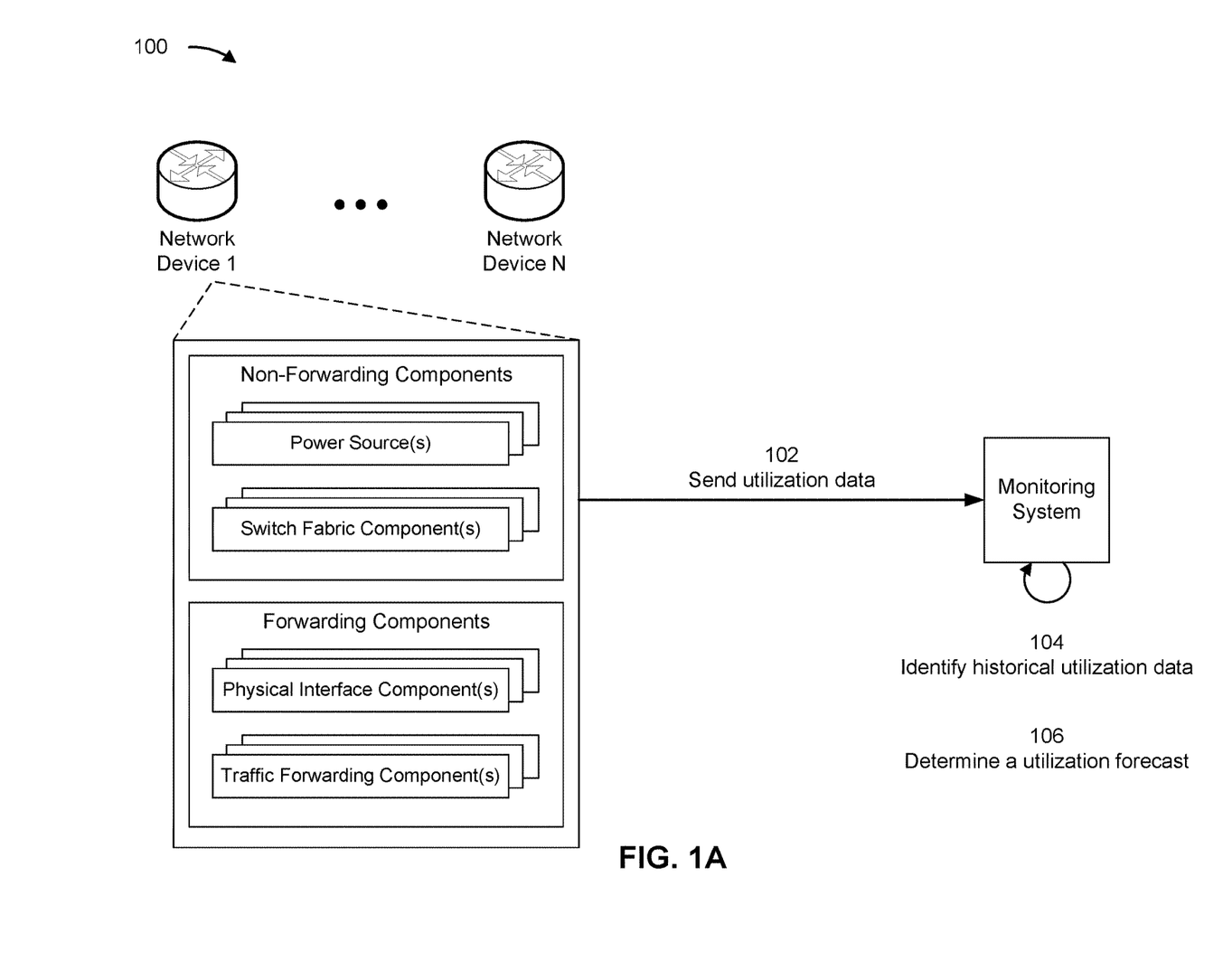
FIGS. 1A-1D are diagrams of one or more example implementations described herein.

As shown in FIG. 1A, and by reference number 102, the network device 1 may send utilization data to the monitoring system. For example, the network device 1 may send the utilization data as the network device 1 generates the utilization data (e.g., in real-time or near real-time). As another example, the network device 1 may send the utilization data to the monitoring system on a scheduled basis, on an on-demand basis, on a triggered basis, or on an ad-hoc basis. The utilization data may indicate, for example, utilization information related to the network device, such as a utilization (e.g., in percentages, packets per second (PPS), bytes per second (BPS), or other metrics) of the network device 1, a utilization of the one or more non-forwarding components and/or the one or more forwarding components of the network device 1, an amount of traffic (e.g., a traffic volume) handled by the network device 1, and/or other information, at a particular time or during a particular time window (e.g., that is less than or equal to 1 minute, 5 minutes, 10 minutes, 15 minutes, 30 minutes, 1 hour, 2 hours, 12 hours, 1 day, and/or 1 week, among other examples). While FIG. 1A shows the network device 1 sending the utilization data to the monitoring system, the one or more network devices (e.g., network devices 1 through N) may send respective utilization data to the monitoring system.

As shown by reference number 104, the monitoring system may identify historical utilization data that is associated with the network device 1. The historical utilization data may include accumulated utilization data that the network device 1 sent to the monitoring system during a period of time (e.g., during the past day, week, month, year, or another period of time). The historical utilization data may also include accumulated utilization data that one or more other network devices sent to the monitoring system during the period of time. For example, when the network device 1 is part of a group of network devices (e.g., a group of "business" network devices, a group of "residential" network devices, a group of "university" network devices, or another group of network devices), the historical utilization data may include accumulated utilization data that the network device 1 and other network devices in the group of network devices sent to the monitoring system. In this way, the historical utilization data may include utilization data from one or more network devices that have may have a same or similar utilization pattern.

As shown by reference number 106, the monitoring system may determine a utilization forecast for the network device 1 (e.g., based on the historical utilization data). For example, the monitoring system may process, using at least one machine learning model, the historical utilization data to determine the utilization forecast. The at least one machine learning model may include, for example, one or more of a multi-layer perception (MLP) model, a long short term memory (LSTM) model, a gated recurrent units (GRU) model, a NeuralProphet model, and/or another machine learning model. The utilization forecast for the network device 1 may indicate a predicted utilization (e.g., in percentages or other metrics) of the network device 1, a predicted utilization of the one or more non-forwarding components and/or the one or more forwarding components of the network device 1, a predicted amount of traffic (e.g., a traffic volume) handled by the network device 1, and/or other predicted information, at one or more future times or during one or more future time windows (e.g., that are less than or equal to 1 minute, 5 minutes, 10 minutes, 15 minutes, 30 minutes, 1 hour, 2 hours, 12 hours, 1 day, and/or 1 week, among other examples). In some implementations, the utilization forecast may indicate that a utilization threshold is predicted to be satisfied at a particular time. For example, the utilization forecast may indicate that a traffic volume threshold is predicted to be satisfied at a particular time (e.g., a predicted traffic volume is predicted to be greater than or equal to the traffic volume threshold, or, alternatively, that the predicted traffic volume is predicted to be less than the traffic volume threshold). In this way, the utilization forecast may indicate when the network device 1 is predicted to be "busy" (e.g., times when the utilization threshold is predicted to be satisfied) and/or when the network device 1 is predicted to be "not busy" (e.g., times when the utilization threshold is predicted to not be satisfied).

Figure 1B:
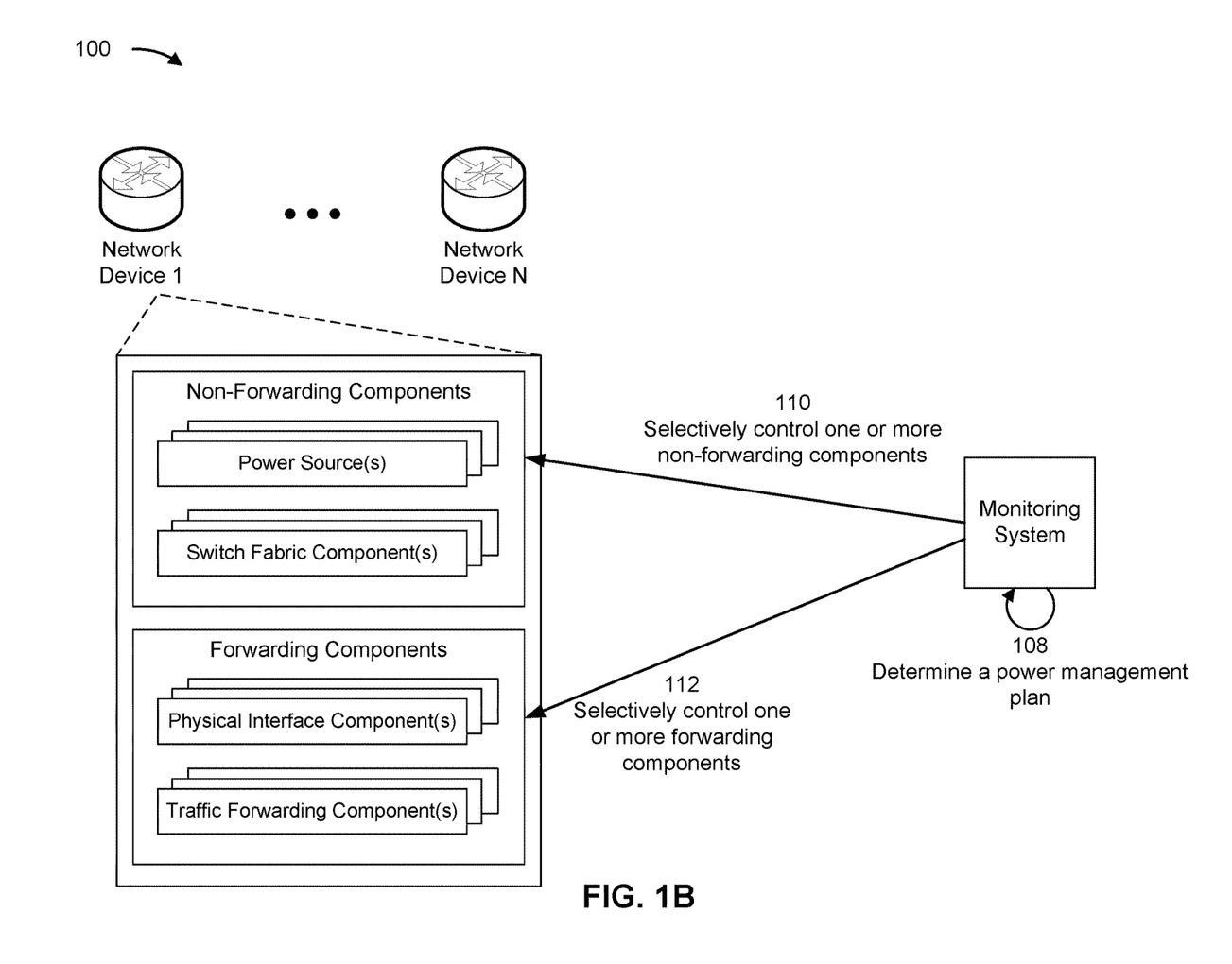

As shown in FIG. 1B, and by reference number 108, the monitoring system may determine a power management plan for the network device 1 (e.g., based on the utilization forecast). For example, the monitoring system may process, using at least one machine learning model (e.g., that is different than the at least one machine learning model that is used to determine the utilization forecast, as described above) and/or other processing techniques, the utilization forecast to determine the power management plan. The power management plan may indicate when one or more components of the network device 1 are to be enabled and/or to be disabled at one or more future times or during one or more future time windows (e.g., that are less than or equal to 1 minute, 5 minutes, 10 minutes, 15 minutes, 30 minutes, 1 hour, 2 hours, 12 hours, 1 day, and/or 1 week, among other examples). For example, the power management plan may indicate that at least one component is to be enabled (or to remain enabled), or is to be disabled (or to remain disabled), at a particular time. As another example, the power management plan may indicate that at least one component is to be enabled at a first time, and is to be disabled at a second time (e.g., that is before or after the first time), or vice versa.

In some implementations, the power management plan may be directed to the one or more non-forwarding components of the network device 1 and therefore may indicate when the one or more non-forwarding components of the network device 1 are to be enabled or disabled. For example, the power management plan may indicate that a non-forwarding component is to be enabled (or to remain enabled), or is to be disabled (or to remain disabled), at a particular time. Additionally, or alternatively, the power management plan may be directed to the one or more forwarding components of the network device 1 and therefore may indicate when the one or more forwarding components of the network device 1 are to be enabled or disabled. For example, the power management plan may indicate that a forwarding component is to be enabled (or to remain enabled), or is to be disabled (or to remain disabled), at a particular time.

In some implementations, when the utilization forecast indicates that a utilization threshold is predicted to be satisfied at a first time (e.g., a utilization of the network device 1 is predicted to fall below the utilization threshold, or, alternatively to rise above the utilization threshold), the power management plan may indicate that at least one component (e.g., at least one non-forwarding component and/or at least one forwarding component) of the network device is to be enabled or to be disabled at a second time that is associated with the first time. The second time may be, for example, the same as the first time (e.g., the power management plan indicates that the at least one component is to be enabled or disabled at the first time). Alternatively, the second time may be a particular amount of time (e.g., that is less than or equal to 1 minute, 5 minutes, 10 minutes, 15 minutes, 30 minutes, 1 hour, or another amount of time) before or after the first time. For example, the second time may be the particular amount of time before the first time when the utilization forecast indicates that the utilization of the network device 1 is to rise above the utilization threshold, which may be associated with the power management plan indicating that the at least one component is to be enabled (e.g., after being disabled). As another example, the second time may be the particular amount of time after the first time when the utilization forecast indicates that the utilization of the network device 1 is to fall below the utilization threshold, which may be associated with the power management plan indicating that the at least one component is to be disabled (e.g., after being enabled).

As shown by reference number 110, the monitoring system may selectively control the one or more non-forwarding components of the network device 1 (e.g., based on the power management plan). For example, the monitoring system may cause the one or more non-forwarding components to be respectively enabled or disabled according to the power management plan. As shown by reference number 112, the monitoring system may selectively control the one or more forwarding components of the network device 1 (e.g., based on the power management plan). For example, the monitoring system may cause the one or more forwarding components to be respectively enabled or disabled according to the power management plan. In this way, the monitoring system may selectively control enablement and disablement of any component of the network device 1.

In some implementations, to selectively control enablement or disablement of at least one component of the network device 1 (e.g., at least one non-forwarding component and/or at least one forwarding component), the monitoring system may generate (e.g., based on the power management plan) one or more instructions (e.g., one or more control instructions) and may send the one or more instructions to the network device 1. The network device 1 may therefore process and/or execute the one or more instructions, which permits the network device 1 to selectively enable and disable the at least one component of the network device 1 (e.g., in accordance with the power management plan). Alternatively, the monitoring system may send the power management plan to the network device 1, which permits the network device 1 to selectively enable and disable the at least one component of the network device 1 (e.g., in accordance with the power management plan), such as by the network device 1 generating and executing the one or more instructions.

Figure 1C:
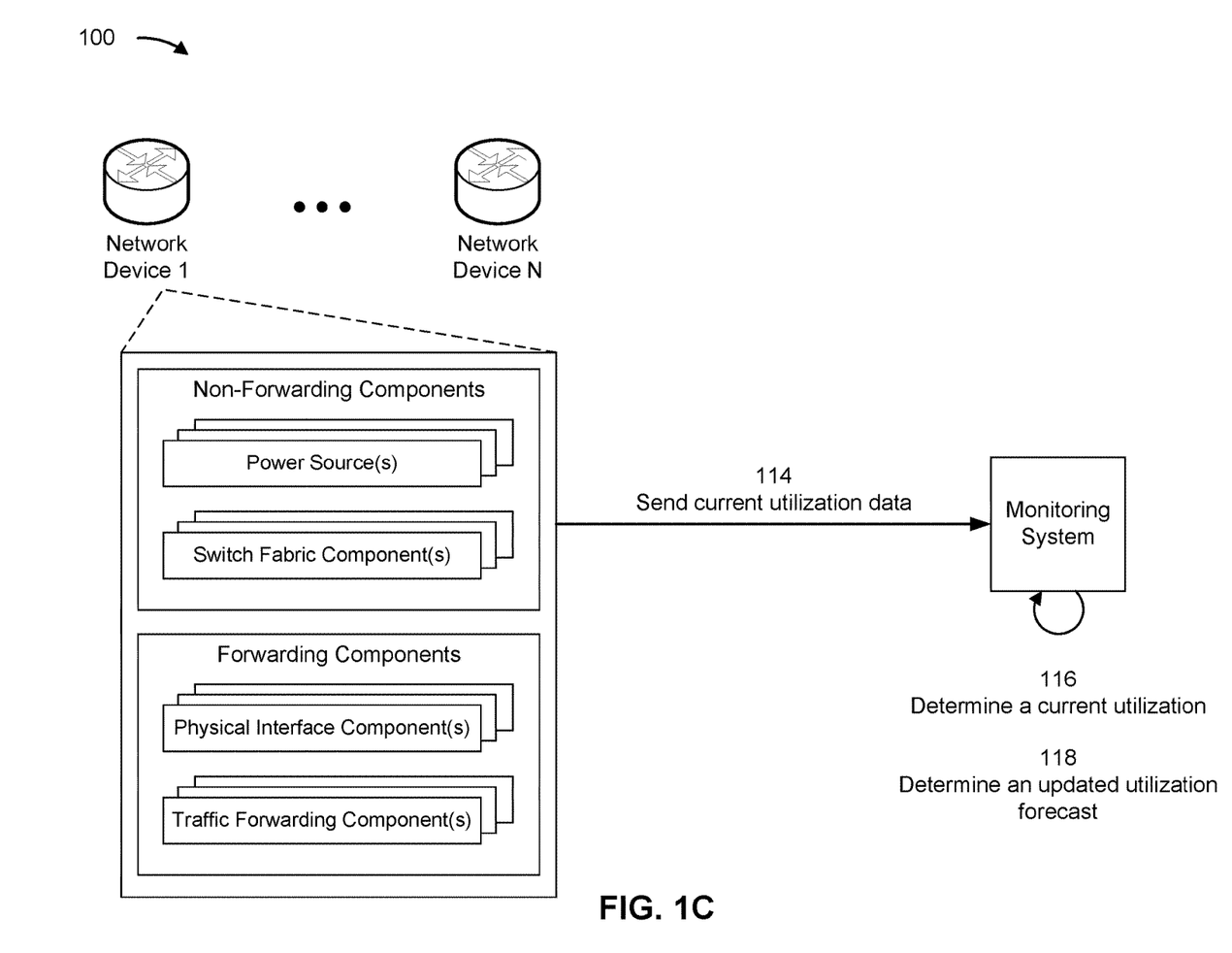

As shown in FIG. 1C, and by reference number 114, the network device 1 may send current utilization data to the monitoring system (e.g., after the monitoring system selectively controls enablement and disablement of the one or more components of the network device 1, such as described herein in relation to FIG. 1B and reference numbers 110 and 112). For example, the network device 1 may send the current utilization data as the network device 1 generates the current utilization data (e.g., in real-time or near real-time). As another example, the network device 1 may send the current utilization data to the monitoring system on a scheduled basis, on an on-demand basis, on a triggered basis, or on an ad-hoc basis. The current utilization data may indicate, for example, current utilization information related to the network device (e.g., the most recent utilization information related to the network device), such as a current utilization (e.g., in percentages or other metrics) of the network device 1, a current utilization of the one or more non-forwarding components and/or the one or more forwarding components of the network device 1, a current amount of traffic (e.g., a current traffic volume) handled by the network device 1, and/or other information, at a current time or during a current time window (e.g., that is less than or equal to 1 minute, 5 minutes, 10 minutes, 15 minutes, 30 minutes, 1 hour, 2 hours, 12 hours, 1 day, and/or 1 week, among other examples, from the current time). While FIG. 1C shows the network device 1 sending the current utilization data to the monitoring system, the one or more network devices (e.g., network devices 1 through N) may send respective current utilization data to the monitoring system.

As shown by reference number 116, the monitoring system may determine a current utilization of the network device 1 (e.g., based on the current utilization data). For example, the monitoring system may process (e.g., parse and/or read) the current utilization data to determine the current utilization of the network device 1, the current utilization of the one or more non-forwarding components and/or the one or more forwarding components of the network device 1, the current amount of traffic handled by the network device 1, and/or other information, at the current time or during the current time window.

In some implementations, the monitoring system may determine that the current utilization of the network device 1 (e.g., at the current time and/or during the current time window) is different than a predicted utilization of the network device 1 (e.g., at the current time and/or during the current time window) that is indicated by the utilization forecast. For example, the current utilization data may indicate that a current traffic volume of the network device 1 is greater than (or, alternatively, less than) a predicted traffic volume of the network device 1 (e.g., at the current time and/or during the current time window), such as by at least a threshold difference amount. Accordingly, the monitoring system may perform one or more processing steps described herein in relation to FIG. 1D.

Additionally, or alternatively, as shown by reference number 118, the monitoring system may determine an updated utilization forecast for the network device 1 (e.g., based on the current utilization data). For example, the monitoring system may process, using at least one machine learning model, the current utilization data (and, in some implementations, the current utilization data and the historical utilization data) to determine the updated utilization forecast (e.g., in a similar manner as that described herein in relation to FIG. 1A and reference number 106). The updated utilization forecast for the network device 1 may indicate an updated predicted utilization (e.g., in percentages or other metrics) of the network device 1, an updated predicted utilization of the one or more non-forwarding components and/or the one or more forwarding components of the network device 1, an updated predicted amount of traffic (e.g., a traffic volume) handled by the network device 1, and/or other updated predicted information, at one or more future times or during one or more future time windows (e.g., that are less than or equal to 1 minute, 5 minutes, 10 minutes, 15 minutes, 30 minutes, 1 hour, 2 hours, 12 hours, 1 day, and/or 1 week, among other examples). In some implementations, the updated utilization forecast may indicate that a utilization threshold is predicted to be satisfied at a particular time. For example, the updated utilization forecast may indicate that a traffic volume threshold is predicted to be satisfied at a particular time (e.g., a predicted traffic volume is predicted to be greater than or equal to the traffic volume threshold, or, alternatively, that the predicted traffic volume is predicted to be less than the traffic volume threshold). In this way, the updated utilization forecast may indicate when the network device 1 is predicted to be "busy" (e.g., times when the utilization threshold is predicted to be satisfied) and/or when the network device 1 is predicted to be "not busy" (e.g., times when the utilization threshold is predicted to not be satisfied).

In some implementations, the updated utilization forecast may be different than the utilization forecast (e.g., that was generated by the monitoring system, as described herein in relation to FIG. 1A and reference number 106). For example, the updated utilization forecast may indicate an updated predicted utilization of the network device 1, an updated predicted utilization of the one or more non-forwarding components and/or the one or more forwarding components of the network device 1, an updated predicted amount of traffic handled by the network device 1, and/or other updated predicted information, at a particular future time or during a particular future time window that is different than (e.g., not equal to) a predicted utilization of the network device 1, a predicted utilization of the one or more non-forwarding components and/or the one or more forwarding components of the network device 1, a predicted amount of traffic handled by the network device 1, and/or other predicted information, at the particular future time or during the particular future time window, that is indicated by the utilization forecast. The monitoring system may determine that the updated utilization forecast is different than the utilization forecast, and, accordingly, may perform the one or more processing steps described herein in relation to FIG. 1D.

Figure 1D:
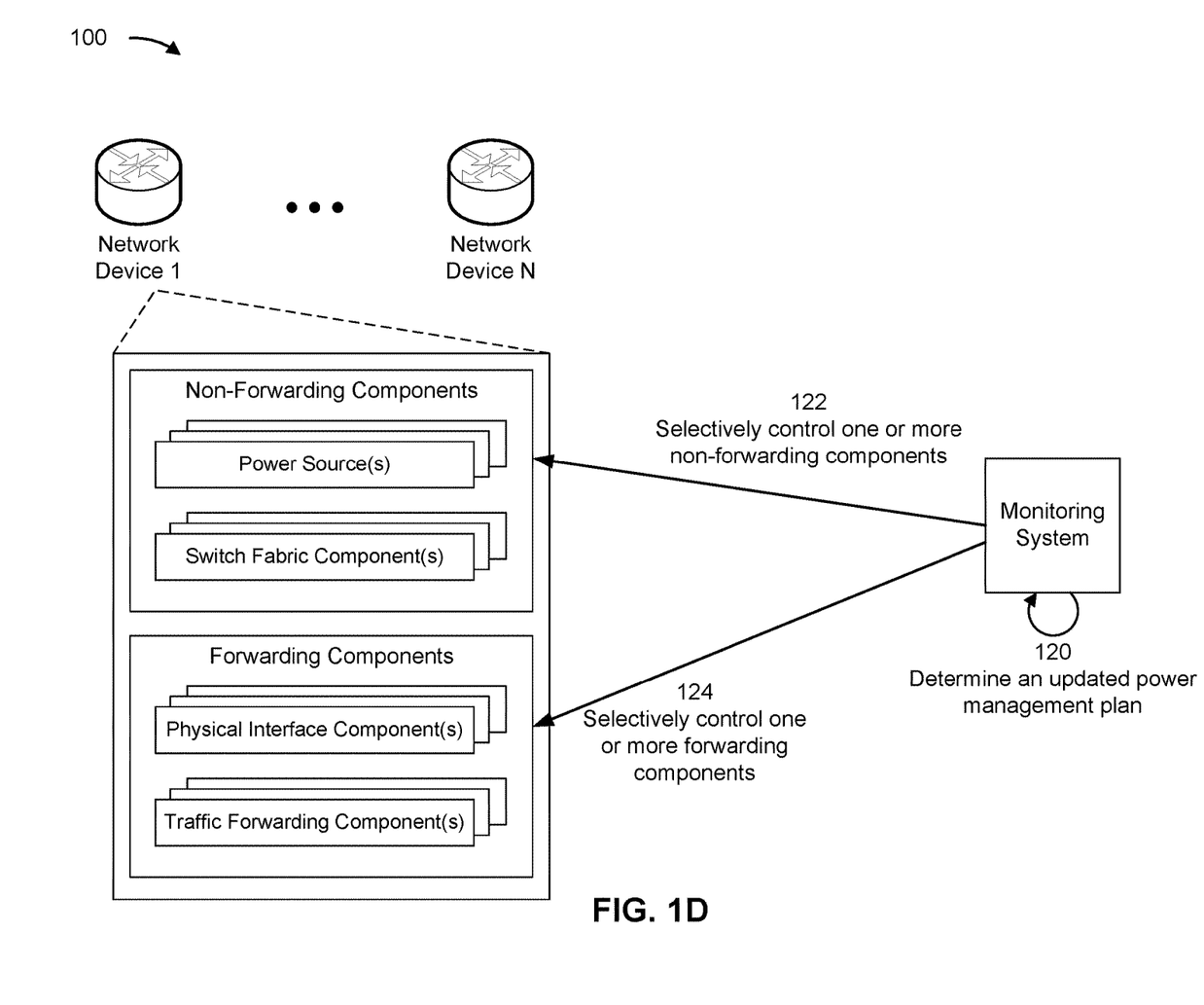

As shown in FIG. 1D, and by reference number 120, the monitoring system may determine an updated power management plan for the network device 1 (e.g., based on the updated utilization forecast). For example, the monitoring system may process, using at least one machine learning model and/or other processing techniques, the updated utilization forecast to determine the updated power management plan (e.g., in a similar manner as that described herein in relation to FIG. 1B and reference number 108). The updated power management plan may indicate when one or more components of the network device 1 are to be enabled and/or to be disabled at one or more future times or during one or more future time windows (e.g., that are less than or equal to 1 minute, 5 minutes, 10 minutes, 15 minutes, 30 minutes, 1 hour, 2 hours, 12 hours, 1 day, and/or 1 week, among other examples). For example, the updated power management plan may indicate that at least one component is to be enabled (or to remain enabled), or is to be disabled (or to remain disabled), at a particular time. As another example, the updated power management plan may indicate that at least one component is to be enabled at a first time, and is to be disabled at a second time (e.g., that is before or after the first time), or vice versa.

In some implementations, the updated power management plan may be different than the power management plan (e.g., that was generated by the monitoring system, as described herein in relation to FIG. 1B and reference number 108). For example, the updated power management plan may indicate that one or more components of the network device 1 are to be enabled at a particular future time or during a future time window and the power management may indicate that one or more components of the network device 1 are to be disabled at the particular future time or during the future time window, or vice versa.

In some implementations, the updated power management plan may be directed to the one or more non-forwarding components of the network device 1 and therefore may indicate when the one or more non-forwarding components of the network device 1 are to be enabled or disabled. For example, the updated power management plan may indicate that a non-forwarding component is to be enabled (or to remain enabled), or is to be disabled (or to remain disabled), at a particular time. Additionally, or alternatively, the updated power management plan may be directed to the one or more forwarding components of the network device 1 and therefore may indicate when the one or more forwarding components of the network device 1 are to be enabled or disabled. For example, the updated power management plan may indicate that a forwarding component is to be enabled (or to remain enabled), or is to be disabled (or to remain disabled), at a particular time.

In some implementations, when the updated utilization forecast indicates that a utilization threshold is predicted to be satisfied at a first time (e.g., a utilization of the network device 1 is predicted to fall below the utilization threshold, or, alternatively to rise above the utilization threshold), the updated power management plan may indicate that at least one component (e.g., at least one non-forwarding component and/or at least one forwarding component) of the network device is to be enabled or to be disabled at a second time that is associated with the first time. The second time may be, for example, the same as the first time (e.g., the updated power management plan indicates that the at least one component is to be enabled or disabled at the first time). Alternatively, the second time may be a particular amount of time (e.g., that is less than or equal to 1 minute, 5 minutes, 10 minutes, 15 minutes, 30 minutes, 1 hour, or another amount of time) before or after the first time. For example, the second time may be the particular amount of time before the first time when the updated utilization forecast indicates that the utilization of the network device 1 is to rise above the utilization threshold, which may be associated with the updated power management plan indicating that the at least one component is to be enabled (e.g., after being disabled). As another example, the second time may be the particular amount of time after the first time when the updated utilization forecast indicates that the utilization of the network device 1 is to fall below the utilization threshold, which may be associated with the updated power management plan indicating that the at least one component is to be disabled (e.g., after being enabled).

As shown by reference number 122, the monitoring system may selectively control the one or more non-forwarding components of the network device 1 (e.g., based on the updated power management plan). For example, the monitoring system may cause the one or more non-forwarding components to be respectively enabled or disabled according to the updated power management plan. As shown by reference number 124, the monitoring system may selectively control the one or more forwarding components of the network device 1 (e.g., based on the updated power management plan). For example, the monitoring system may cause the one or more forwarding components to be respectively enabled or disabled according to the updated power management plan. In this way, the monitoring system may selectively control enablement and disablement of any component of the network device 1.

In some implementations, to selectively control enablement or disablement of at least one component of the network device 1 (e.g., at least one non-forwarding component and/or at least one forwarding component), the monitoring system may generate (e.g., based on the updated power management plan) one or more updated instructions (e.g., one or more updated control instructions) and may send the one or more updated instructions to the network device 1. The network device 1 may therefore process and/or execute the one or more updated instructions, which permits the network device 1 to selectively enable and disable the at least one component of the network device 1 (e.g., in accordance with the updated power management plan). Alternatively, the monitoring system may send the updated power management plan to the network device 1, which permits the network device 1 to selectively enable and disable the at least one component of the network device 1 (e.g., in accordance with the updated power management plan), such as by the network device 1 generating and executing the one or more updated instructions.

In some implementations, the monitoring system may selectively control enablement or disablement of at least one component of the network device 1 (e.g., at least one non-forwarding component and/or at least one forwarding component) based on the current utilization of the network device 1 (e.g., regardless of the power management plan and/or the updated power management plan). For example, when the monitoring system determines that the current utilization of the network device 1 (e.g., at the current time and/or during the current time window) is different than a predicted utilization of the network device 1 (e.g., at the current time and/or during the current time window) that is indicated by the utilization forecast (e.g., as described herein in relation to FIG. 1C and reference number 116), the monitoring system may selectively control enablement or disablement of the at least one component of the network device 1. For example, when the current utilization is greater than the predicted utilization, the monitoring system may cause the at least one component to be enabled. As an alternative example, when the current utilization is less than the predicted utilization, the monitoring system may cause the at least one component to be disabled. In this way, the monitoring system permits the at least one component to have an enablement status (e.g., enabled or disabled) that is different than an enablement status that is indicated for the at least one component by the power management plan (and/or the updated power management plan).

As indicated above, FIGS. 1A-1D are provided merely as one or more examples. Other examples may differ from what is described with regard to FIGS. 1A-1D.

Figure 2:
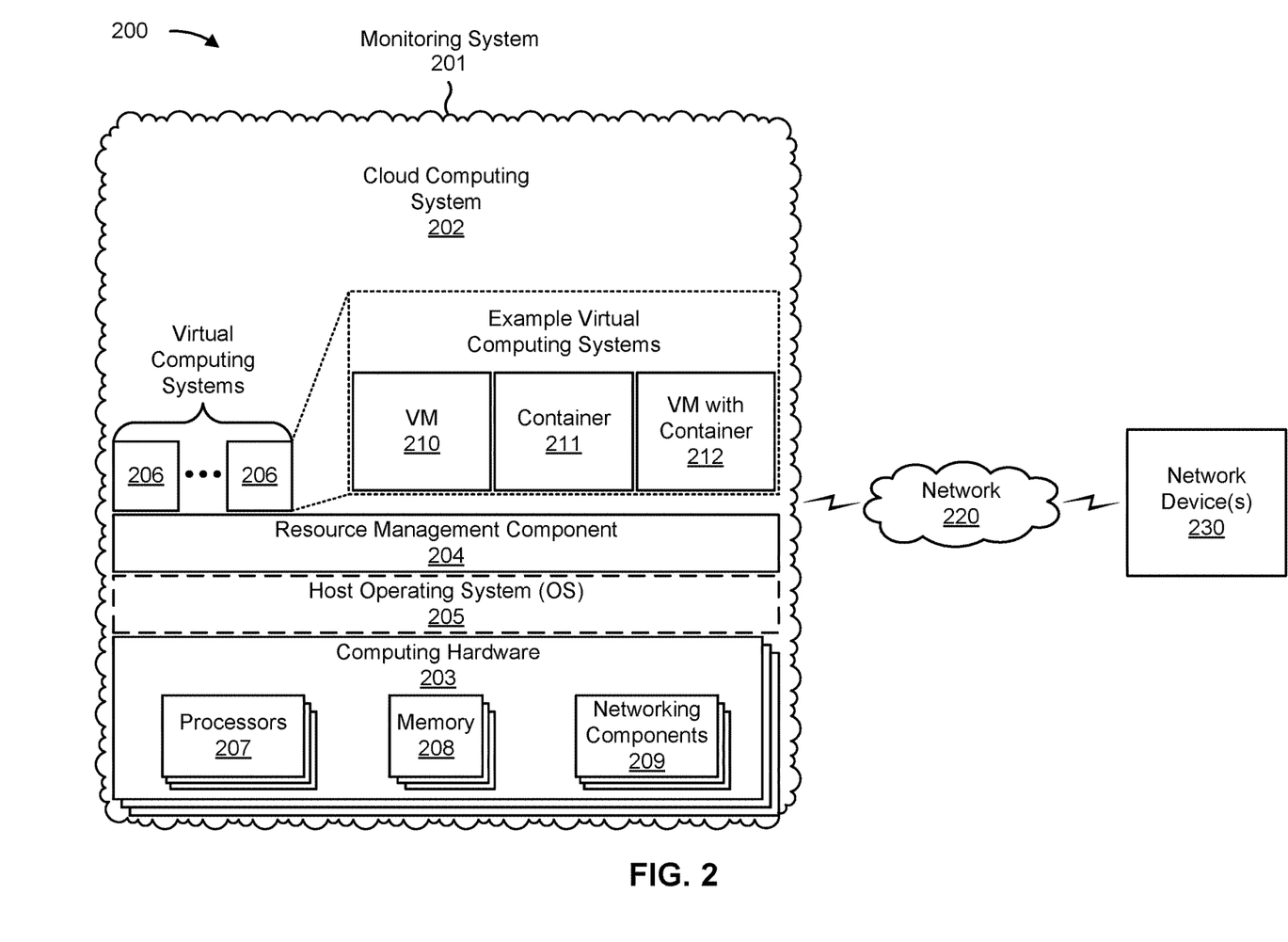
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a monitoring system 201, which may include one or more elements of and/or may execute within a cloud computing system 202. The cloud computing system 202 may include one or more elements 203-212, as described in more detail below. As further shown in FIG. 2, environment 200 may include a network 220, and/or a network device 230. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the monitoring system 201 may include one or more elements 203-212 of the cloud computing system 202, may execute within the cloud computing system 202, and/or may be hosted within the cloud computing system 202, in some implementations, the monitoring system 201 may not be cloud-based (e.g., may be implemented outside of a cloud computing system) or may be partially cloud-based. For example, the monitoring system 201 may include one or more devices that are not part of the cloud computing system 202, such as device 300 of FIG. 3 and/or device 400 of FIG. 4, which may include a standalone server or another type of computing device. The monitoring system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The network device 230 may include one or more devices capable of receiving, processing, storing, routing, and/or providing traffic (e.g., a packet and/or other information or metadata) in a manner described herein. For example, the network device 230 may include a router, such as a label switching router (LSR), a label edge router (LER), an ingress router, an egress router, a provider router (e.g., a provider edge router or a provider core router), a virtual router, or another type of router. Additionally, or alternatively, the network device 230 may include a gateway, a switch, a firewall, a hub, a bridge, a reverse proxy, a server (e.g., a proxy server, a cloud server, or a data center server), a load balancer, and/or a similar device. In some implementations, the network device 230 may be a physical device implemented within a housing, such as a chassis. In some implementations, the network device 230 may be a virtual device implemented by one or more computing devices of a cloud computing environment or a data center. In some implementations, a group of network devices 230 may be a group of data center nodes that are used to route traffic flow through a network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
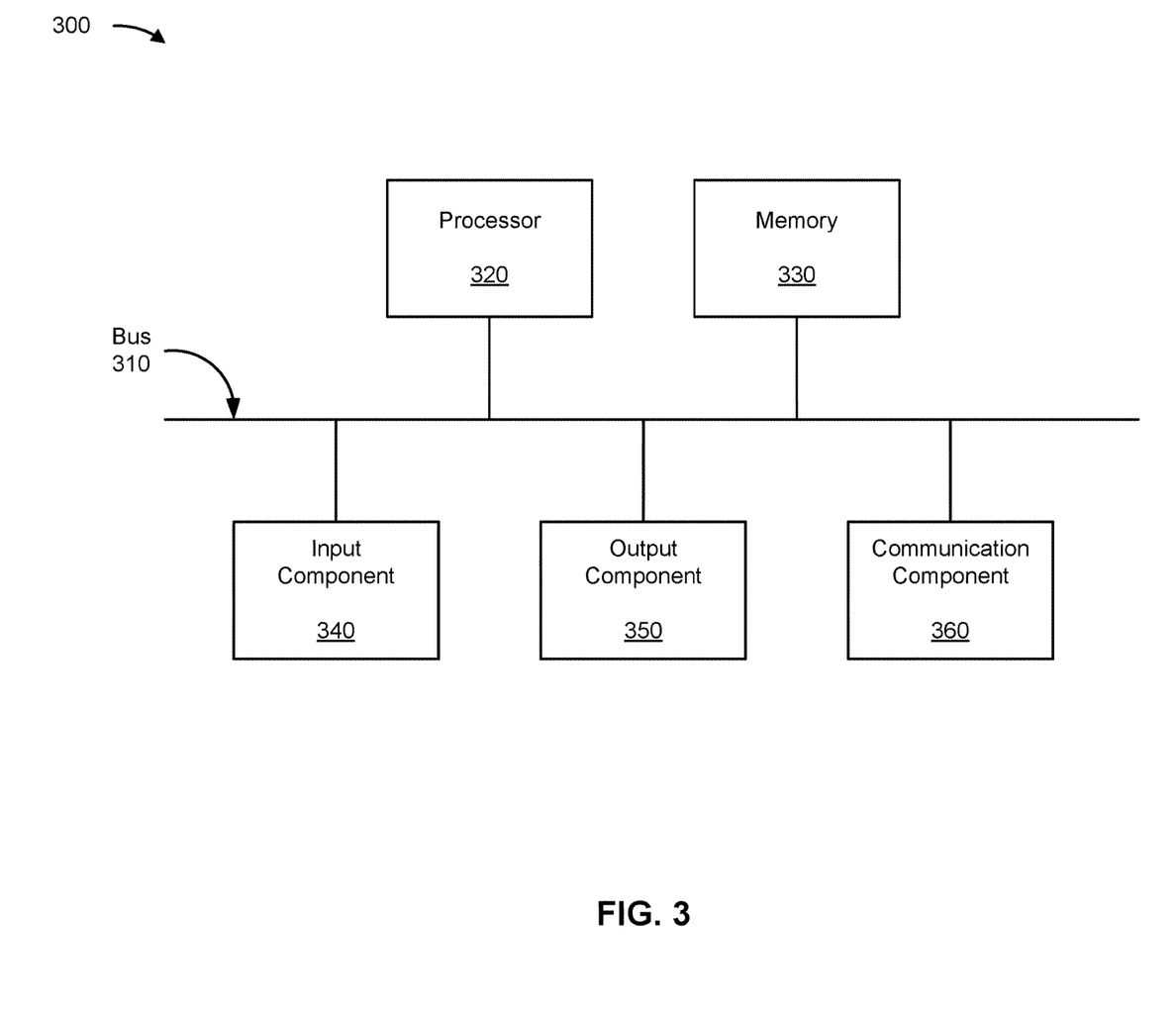
FIG. 3 is a diagram of example components of a device associated with power management of a network device.

FIG. 3 is a diagram of example components of a device 300 associated with power management of a network device. The device 300 may correspond to the monitoring system 201, the computing hardware 203, and/or the network device 230. In some implementations, the monitoring system 201, the computing hardware 203, and/or the network device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
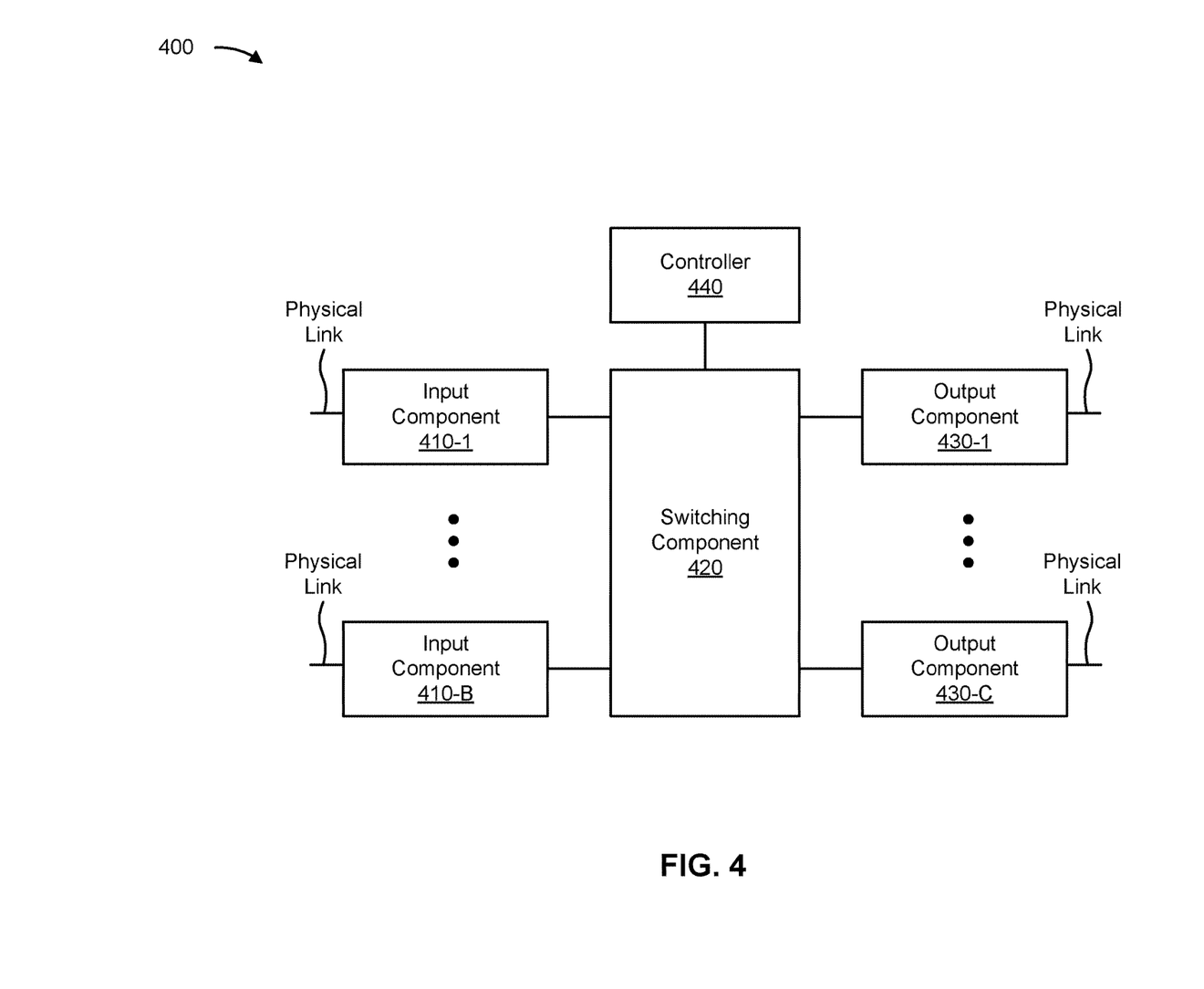
FIG. 4 is a diagram of example components of a device associated with power management of a network device.

FIG. 4 is a diagram of example components of a device 400 associated with power management of a network device. Device 400 may correspond to the monitoring system 201, the computing hardware 203, and/or the network device 230. In some implementations, the monitoring system 201, the computing hardware 203, and/or the network device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
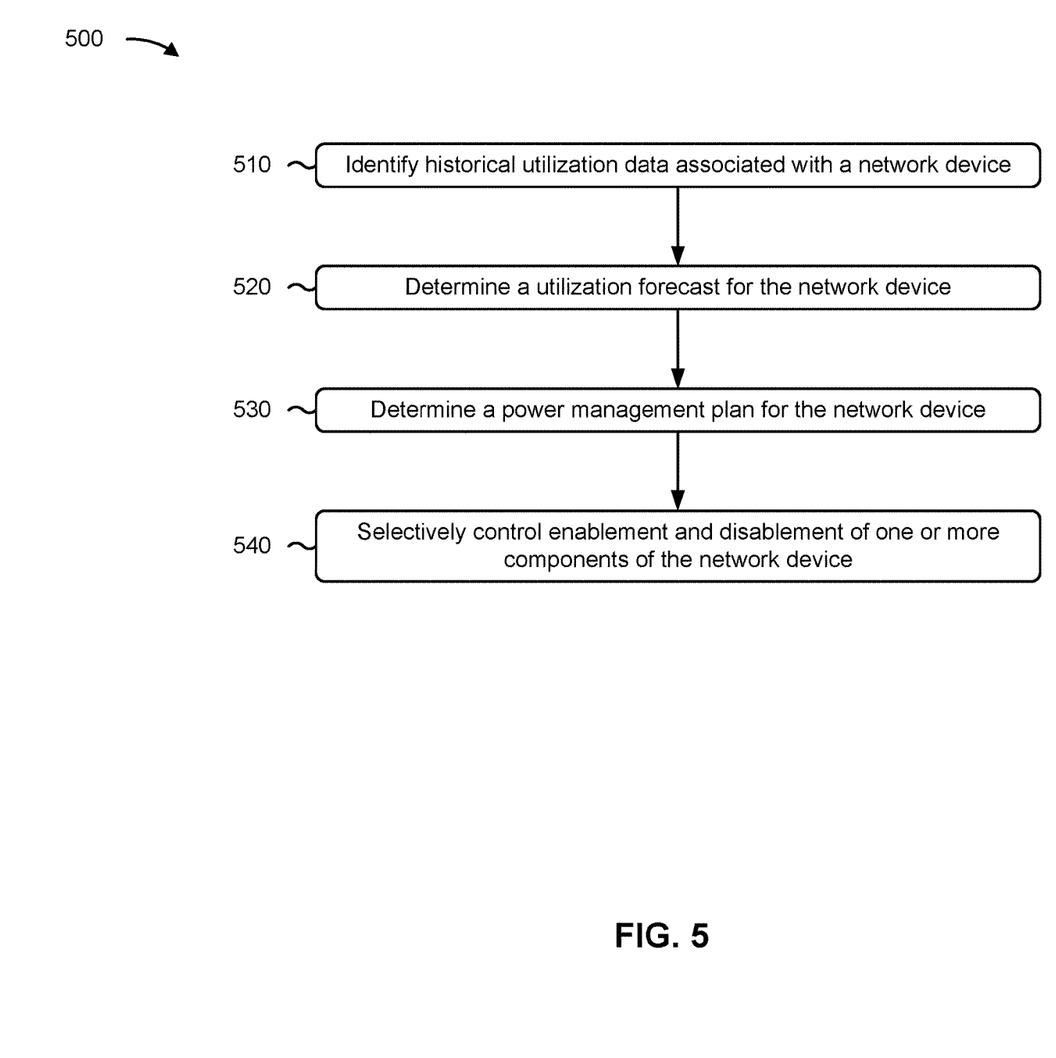
FIG. 5 is a flowchart of an example process associated with power management of a network device.

FIG. 5 is a flowchart of an example process 500 associated with power management of a network device. In some implementations, one or more process blocks of FIG. 5 are performed by a system (e.g., the monitoring system 201). In some implementations, one or more process blocks of FIG. 5 are performed by another device or a group of devices separate from or including the system, such as a network device (e.g., the network device 230). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include identifying historical utilization data associated with a network device (block 510). For example, the system may identify historical utilization data associated with a network device, as described above.

As further shown in FIG. 5, process 500 may include determining a utilization forecast for the network device (block 520). For example, the system may determine, based on the historical utilization data, a utilization forecast for the network device, as described above.

As further shown in FIG. 5, process 500 may include determining a power management plan for the network device (block 530). For example, the system may determine, based on the utilization forecast, a power management plan for the network device, as described above.

As further shown in FIG. 5, process 500 may include selectively controlling enablement and disablement of one or more components of the network device (block 540). For example, the system may selectively control, based on the power management plan, enablement and disablement of one or more components (e.g., one or more non-forwarding components and/or one or more forwarding components) of the network device, as described above.

Process 500 may include additional implementations, such as any single implementation or any combination of implementations described below and/or in connection with one or more other processes described elsewhere herein.

In a first implementation, the one or more non-forwarding components of the network device include at least one of a switch fabric component or a power source component.

In a second implementation, alone or in combination with the first implementation, process 500 includes selectively controlling, by the system and based on the power management plan, enablement and disablement of one or more forwarding components of the network device.

In a third implementation, alone or in combination with one or more of the first and second implementations, the one or more forwarding components of the network device include at least one of a physical interface component or a traffic forwarding component.

In a fourth implementation, alone or in combination with one or more of the first through third implementations, the utilization forecast indicates that a utilization threshold is predicted to be satisfied at a first time, and the power management plan indicates that at least one non-forwarding component, of the one or more non-forwarding components, is to be enabled or to be disabled at a second time that is a particular amount of time before or after the first time.

In a fifth implementation, alone or in combination with one or more of the first through fourth implementations, process 500 includes obtaining, after selectively controlling enablement and disablement of the one or more non-forwarding components of the network device based on the power management plan, current utilization data associated with the network device; determining, based on the current utilization data, an updated power management plan for the network device; and selectively controlling, based on the updated power management plan, enablement and disablement of the one or more non-forwarding components of the network device.

In a sixth implementation, alone or in combination with one or more of the first through fifth implementations, determining the updated power management plan comprises determining, based on the current utilization data, an updated utilization forecast for the network device, and determining, based on the updated utilization forecast, the updated power management plan.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   identifying, by a system, historical utilization data associated with a network device;
   determining, by the system and based on the historical utilization data, a utilization forecast for the network device;
   determining, by the system and based on the utilization forecast, a power management plan for the network device;
   selectively controlling, by the system and based on the power management plan, enablement and disablement of one or more non-forwarding components of the network device;
   obtaining, by the system and after selectively controlling enablement and disablement of the one or more non-forwarding components of the network device based on the power management plan, current utilization data associated with the network device;
   determining, by the system and based on the current utilization data, that a current utilization of the network device is different than a predicted utilization of the network device indicated by the utilization forecast; and
   selectively controlling, by the system and based on determining that the current utilization of the network device is different than the predicted utilization of the network device, enablement and disablement of the one or more non-forwarding components of the network device, wherein a component of the one or more non-forwarding components of the network device is permitted to have an enablement status that is different than an enablement status that is indicated for the component by the power management plan.

2. The method of claim 1, wherein the one or more non-forwarding components of the network device include at least one of:
   a switch fabric component; or
   a power source component.

3. The method of claim 1, further comprising:
   selectively controlling, by the system and based on the power management plan, enablement and disablement of one or more forwarding components of the network device.

4. The method of claim 3, wherein the one or more forwarding components of the network device include at least one of:
a physical interface component; or
a traffic forwarding component.

5. The method of claim 1, wherein:
the utilization forecast indicates that a utilization threshold is predicted to be satisfied at a first time; and
the power management plan indicates that at least one non-forwarding component, of the one or more non-forwarding components, is to be enabled or to be disabled at a second time that is a particular amount of time before or after the first time.

6. The method of claim 1, further comprising:
determining, based on the current utilization data, an updated power management plan for the network device; and
selectively controlling, based on the updated power management plan, enablement and disablement of the one or more non-forwarding components of the network device.

7. The method of claim 6, wherein determining the updated power management plan comprises:
determining, based on the current utilization data, an updated utilization forecast for the network device; and
determining, based on the updated utilization forecast, the updated power management plan.

8. A non-transitory computer-readable medium storing a set of instructions, the set of instructions comprising:
one or more instructions that, when executed by one or more processors of a system, cause the system to:
determine, based on historical utilization data associated with a network device, a utilization forecast for the network device;
determine, based on the utilization forecast, a power management plan for the network device;
selectively control, based on the power management plan, enablement and disablement of one or more non-forwarding components of the network device;
obtain, after selectively controlling enablement and disablement of the one or more non-forwarding components of the network device based on the power management plan, current utilization data associated with the network device;
determine, based on the current utilization data, that a current utilization of the network device is different than a predicted utilization of the network device indicated by the utilization forecast; and
selectively control, based on determining that the current utilization of the network device is different than the predicted utilization of the network device, enablement and disablement of the one or more non-forwarding components of the network device, wherein a component of the one or more non-forwarding components of the network device is permitted to have an enablement status that is different than an enablement status that is indicated for the component by the power management plan.

9. The non-transitory computer-readable medium of claim 8, wherein the one or more instructions, that cause the system to determine the utilization forecast for the network device, cause the system to:
process, using at least one machine learning model, the historical utilization data to determine the utilization forecast.

10. The non-transitory computer-readable medium of claim 8, wherein the one or more instructions further cause the system to:
selectively control, based on the power management plan, enablement and disablement of one or more forwarding components of the network device.

11. The non-transitory computer-readable medium of claim 8, wherein the power management plan indicates that at least one non-forwarding component, of the one or more non-forwarding components, is to be enabled at a first time and is to be disabled at a second time.

12. The non-transitory computer-readable medium of claim 8, wherein the one or more instructions, that cause the system to selectively control enablement and disablement of one or more non-forwarding components of the network device, cause the system to:
generate, based on the power management plan, one or more instructions; and
send, to the network device, the one or more instructions, wherein sending the one or more instructions permits the network device to selectively enable and disable the one or more non-forwarding components in accordance with the power management plan.

13. The non-transitory computer-readable medium of claim 8, wherein the one or more instructions, that cause the system to selectively control enablement and disablement of one or more non-forwarding components of the network device, cause the system to:
send, to the network device, the power management plan, wherein sending the power management plan permits the network device to selectively enable and disable the one or more non-forwarding components in accordance with the power management plan.

14. The non-transitory computer-readable medium of claim 8, wherein the one or more instructions further cause the system to:
determine, based on the current utilization data, an updated power management plan for the network device; and
selectively control, based on the updated power management plan, enablement and disablement of the one or more non-forwarding components of the network device.

15. The non-transitory computer-readable medium of claim 14, wherein the one or more instructions, that cause the system to determine the updated power management plan, cause the system to:
process, using at least one machine learning model, the current utilization data to determine an updated utilization forecast; and
determine, based on the updated utilization forecast, the updated power management plan.

16. A system, comprising:
one or more memories; and
one or more processors to:
determine a utilization forecast for a network device;
determine, based on the utilization forecast, a power management plan for the network device;
selectively control, based on the power management plan, enablement and disablement of one or more components of the network device;
obtain, after selectively controlling enablement and disablement of the one or more components of the network device based on the power management plan, current utilization data associated with the network device;

determine, based on the current utilization data, that a current utilization of the network device is different than a predicted utilization of the network device indicated by the utilization forecast; and selectively control, based on determining that the current utilization of the network device is different than the predicted utilization of the network device, enablement and disablement of the one or more components of the network device, wherein a component of the one or more components of the network device is permitted to have an enablement status that is different than an enablement status that is indicated for the component by the power management plan.

17. The system of claim 16, wherein the one or more components of the network device include at least one of:
a physical interface device (IFD);
a port interface card (PIC);
a flexible PIC concentrator (FPC); or
a packet forwarding engine (PFE).

18. The system of claim 16, wherein:

the utilization forecast indicates that a utilization threshold is predicted to be satisfied at a first time; and the power management plan indicates that at least one component, of the one or more components, is to be enabled or to be disabled at a second time that is associated with the first time.

19. The system of claim 16, wherein the one or more components include a system interface board (SIB) and a power supply module (PSM).

20. The system of claim 16, wherein the one or more components of the network device include at least one of:
a switch fabric component;
a power source component;
a physical interface component; or
a traffic forwarding component.

* * * * *